US008792430B2

(12) United States Patent
Luo et al.

(10) Patent No.: US 8,792,430 B2
(45) Date of Patent: Jul. 29, 2014

(54) RETRANSMISSION GRANT HANDLING IN A WIRELESS COMMUNICATIONS SYSTEM

(75) Inventors: Tao Luo, San Diego, CA (US); Wei-Jei Song, San Diego, CA (US); Puneet Sethi, San Diego, CA (US); Kibeom Seong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 667 days.

(21) Appl. No.: 12/973,418

(22) Filed: Dec. 20, 2010

(65) Prior Publication Data

US 2011/0176619 A1    Jul. 21, 2011

Related U.S. Application Data

(60) Provisional application No. 61/288,825, filed on Dec. 21, 2009.

(51) Int. Cl.
*H04W 4/00* (2009.01)
*H04W 72/04* (2009.01)

(52) U.S. Cl.
CPC .................................. *H04W 72/04* (2013.01)
USPC .......................................... 370/329; 370/332

(58) Field of Classification Search
USPC .......... 375/259, 295, 316; 370/276, 277, 278, 370/282
See application file for complete search history.

(56) References Cited

U.S. PATENT DOCUMENTS

| | | | | |
|---|---|---|---|---|
| 8,284,732 | B2* | 10/2012 | Nimbalker et al. | 370/330 |
| 8,331,252 | B2* | 12/2012 | Visuri et al. | 370/252 |
| 8,385,239 | B2* | 2/2013 | Golitschek Edler von Elbwart et al. | 370/310 |
| 8,385,284 | B2* | 2/2013 | Wengerter et al. | 370/329 |
| 2008/0310395 | A1* | 12/2008 | Kashima | 370/350 |
| 2009/0047911 | A1* | 2/2009 | Rao et al. | 455/68 |
| 2009/0104916 | A1* | 4/2009 | Rosa et al. | 455/453 |
| 2010/0061345 | A1* | 3/2010 | Wengerter et al. | 370/335 |
| 2010/0098006 | A1* | 4/2010 | Golitschek Edler Von Elbwart et al. | 370/329 |
| 2010/0184489 | A1* | 7/2010 | Penther et al. | 455/574 |
| 2011/0085508 | A1* | 4/2011 | Wengerter et al. | 370/329 |
| 2011/0107169 | A1* | 5/2011 | Lohr et al. | 714/748 |
| 2011/0176619 | A1* | 7/2011 | Luo et al. | 375/259 |
| 2011/0194523 | A1* | 8/2011 | Chung et al. | 370/329 |
| 2011/0294439 | A1* | 12/2011 | Ofuji et al. | 455/70 |

OTHER PUBLICATIONS

3rd Generation Partnership Project; Technical Specification Group Radio Access Network; Evolved Universal Terrestrial Radio Access (E-UTRA); Physical layer procedures (Release 9), 3GPP Standard; 3GPP TS 36.213, 3rd Generation Partnership Project (3GPP), Mobile Competence Centre ; 650, Route Des Lucioles F-06921 Sophia-Antipolis Cedex; France, No. V9.0.1, Dec. 17, 2009, pp. 1-81, XP050401048, [retrieved on Dec. 17, 2009] p. 9, paragraph 5.1—p. 12 p. 23, paragraph 7.1.6—p. 28, paragraph 7.1.7.2.1.

(Continued)

*Primary Examiner* — Hassan Kizou
*Assistant Examiner* — Phyllis Book
(74) *Attorney, Agent, or Firm* — Paul Kuo

(57) ABSTRACT

A method, an apparatus, and a computer program product for wireless communication are provided that may help account for scenarios in which a transport block size (TBS) for a retransmission may be determined based on a first grant, while a number of resource blocks (RBs) assigned for the retransmission may be determined from a second grant.

14 Claims, 9 Drawing Sheets

(56) References Cited

OTHER PUBLICATIONS

3rd Generation Partnership Project; Technical Specification Group Radio Access Network; MAC protocol specification (Release 5), 3GPP Standard; 3GPP TS 25.321, 3rd Generation Partnership Project (3GPP), Mobile Competence Centre ; 650, Route Des Lucioles ; F-06921 Sophia-Antipolis Cedex ; France, No. V5.2.0, Sep. 1, 2002, pp. 1-53, XP050367673, p. 31, paragraph 9.2.3.1—p. 32; table 9.2.3.1.

Ericsson: "PDCCH contents—status from e-mail discussions", 3GPP Draft; R1-073809, 3rd Generation Partnership Project (3GPP), Mobile Competence Centre ; 650, Route Des Lucioles ; F-06921 Sophia-Antipolis Cedex ; France, vol. RAN WGI, No. Athens, Greece; Aug. 20, 2007, XP050107384, [retrieved on Aug. 20, 2007] the whole document.

International Search Report and Written Opinion—PCT/US2010/061644—ISA/EPO—Jul. 26, 2007.

Lucent Technologies et al: "Transport Block Size Set Definition and Signalling for HSDPA", 3GPP Draft; R1-02-1327-TB Size, 3rd Generation Partnership Project (3GPP), Mobile Competence Centre ; 650, Route Des Lucioles ; F-06921 Sophia-Antipolis Cedex ; France, vol . RAN WG1, No. Shanghai , China; Nov. 4, 2002, XP050096968, [retrieved on Nov. 4, 2002] p. 1, paragraph 1—p. 2, paragraph 3.1.

Motorola: "Uplink Power Control for Re-transmissions", 3GPP Draft; R1-082475, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 24, 2008, XP050110745, [retrieved on Jun. 24, 2008] the whole document.

NTT Docomo et al: "L1/L2 Control Channel Structure for E-UTRA Downlink", 3GPP Draft; R1-060032 DL L1L2 Control Channel, 3rd Generation Partnership Project (3GPP), Mobile Competence Centre ; 650, Route Des Lucioles ; F-06921 Sophia-Antipolis Cedex ; France, vol. RAN WGI, No. Helsinki, Finland; Jan. 23, 2006, Jan. 19, 2006, XP050417419, [retrieved on Jan. 19, 2006] p. 5, paragraph 3—p. 7.

Qualcomm Europe: "On Handling Inconsistent Control Information" 3GPP TSG-RAN WG1 56BIS, No. R1-091441, Mar. 23, 2009, pp. 1-5, XP002586569 [retrieved on Jun. 8, 2010].

Required reliability of SPS uplink grant, 3GPP Draft; R2-083500 Required Reliability of SPS Uplink Grant, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; Jun. 24, 2008, XP050140879, [retrieved on Jun. 24, 2008] p. 1, paragraph 1—p. 2, line 2.

* cited by examiner

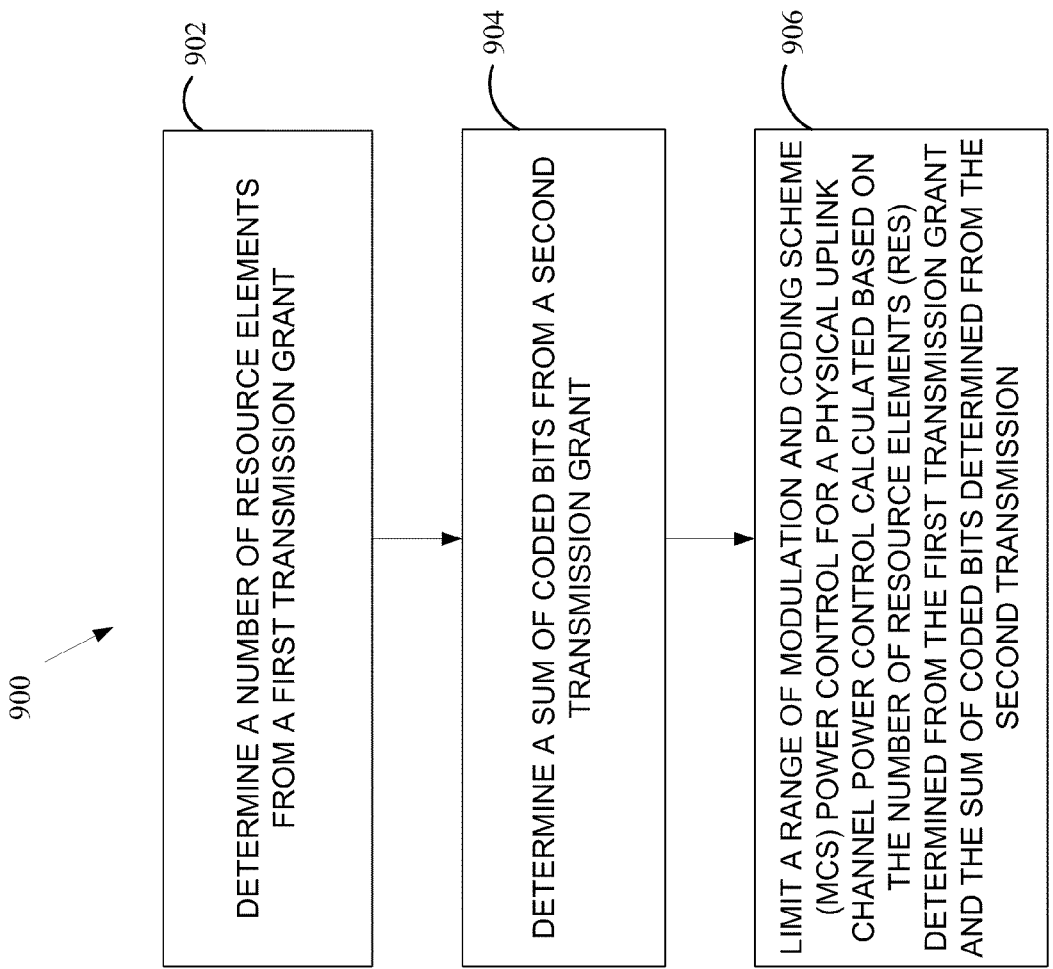

RETRANSMISSION GRANT HANDLING IN A WIRELESS COMMUNICATIONS SYSTEM

CLAIM OF PRIORITY UNDER 35 U.S.C. §119

This application claims priority to U.S. Provisional Application No. 61/288,825, entitled "UL/DL PDCCH Retransmission Grant Handling for LTE," filed Dec. 21, 2009, and assigned to the assignee hereof and hereby expressly incorporated by reference herein.

BACKGROUND

1. Field

This disclosure generally relates to communication systems and, more particularly, to uplink/downlink retransmission grant handling for telecommunication standard Long Term Evolution (LTE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the disclosure provide a method of wireless communication. The method generally includes determining a transport block size based on information contained in a first transmission grant, determining a number of resource blocks from a second transmission grant, determining a code rate based, at least in part, on the transport block size and the number of resource blocks, and in response to determining the code rate exceeds a threshold value, ignoring a transmission corresponding to the second transmission grant.

Certain aspects of the disclosure provide a method of wireless communication. The method generally includes determining a number of resource elements from a first transmission grant, determining a sum of coded bits from a second transmission grant, and limiting a range of modulation and coding scheme (MCS) power control for a physical uplink channel power control calculated based on the number of resource elements (REs) determined from the first transmission grant and the sum of coded bits determined from the second transmission grant.

Certain aspects of the disclosure provide an apparatus for wireless communication. The apparatus generally includes means for determining a transport block size based on information contained in a first transmission grant, means for determining a number of resource blocks from a second transmission grant, means for determining a code rate based, at least in part, on the transport block size and the number of resource blocks, and means for, in response to determining the code rate exceeds a threshold value, ignoring a transmission corresponding to the second transmission grant.

Certain aspects of the disclosure provide an apparatus for wireless communication. The apparatus generally includes means for determining a number of resource elements from a first transmission grant, means for determining a sum of coded bits from a second transmission grant, and means for limiting a range of modulation and coding scheme (MCS) power control for a physical uplink channel power control calculated based on the number of resource elements (REs) determined from the first transmission grant and the sum of coded bits determined from the second transmission grant.

Certain aspects of the disclosure provide an apparatus for wireless communication. The apparatus generally includes at least one processor configured to determine a transport block size based on information contained in a first transmission grant, determine a number of resource blocks from a second transmission grant, determine a code rate based, at least in part, on the transport block size and the number of resource blocks, and, in response to determining the code rate exceeds a threshold value, ignore a transmission corresponding to the second transmission grant; and a memory coupled with the at least one processor.

Certain aspects of the disclosure provide an apparatus for wireless communication. The apparatus generally includes at least one processor configured to determine a number of resource elements from a first transmission grant, determine a sum of coded bits from a second transmission grant, and limit a range of modulation and coding scheme (MCS) power control for a physical uplink channel power control calculated based on the number of resource elements (REs) determined from the first transmission grant and the sum of coded bits determined from the second transmission grant; and a memory coupled with the at least one processor.

Certain aspects of the disclosure provide a computer-program product comprising a computer-readable storage medium having instructions stored thereon. The instructions are generally executable by a processor for determining a transport block size based on information contained in a first transmission grant, determining a number of resource blocks from a second transmission grant, determining a code rate based, at least in part, on the transport block size and the number of resource blocks, and in response to determining the code rate exceeds a threshold value, ignoring a transmission corresponding to the second transmission grant.

Certain aspects of the disclosure provide a computer-program product comprising a computer-readable storage medium having instructions stored thereon. The instructions are generally executable by a processor for determining a number of resource elements from a first transmission grant, determining a sum of coded bits from a second transmission grant, and limiting a range of modulation and coding scheme (MCS) power control for a physical uplink channel power control calculated based on the number of resource elements (REs) determined from the first transmission grant and the sum of coded bits determined from the second transmission grant.

BRIEF DESCRIPTION OF THE DRAWINGS

FIG. 9 is a flow chart of another method of wireless communication, in accordance with certain aspects of the disclosure.

DETAILED DESCRIPTION

Figure 1:
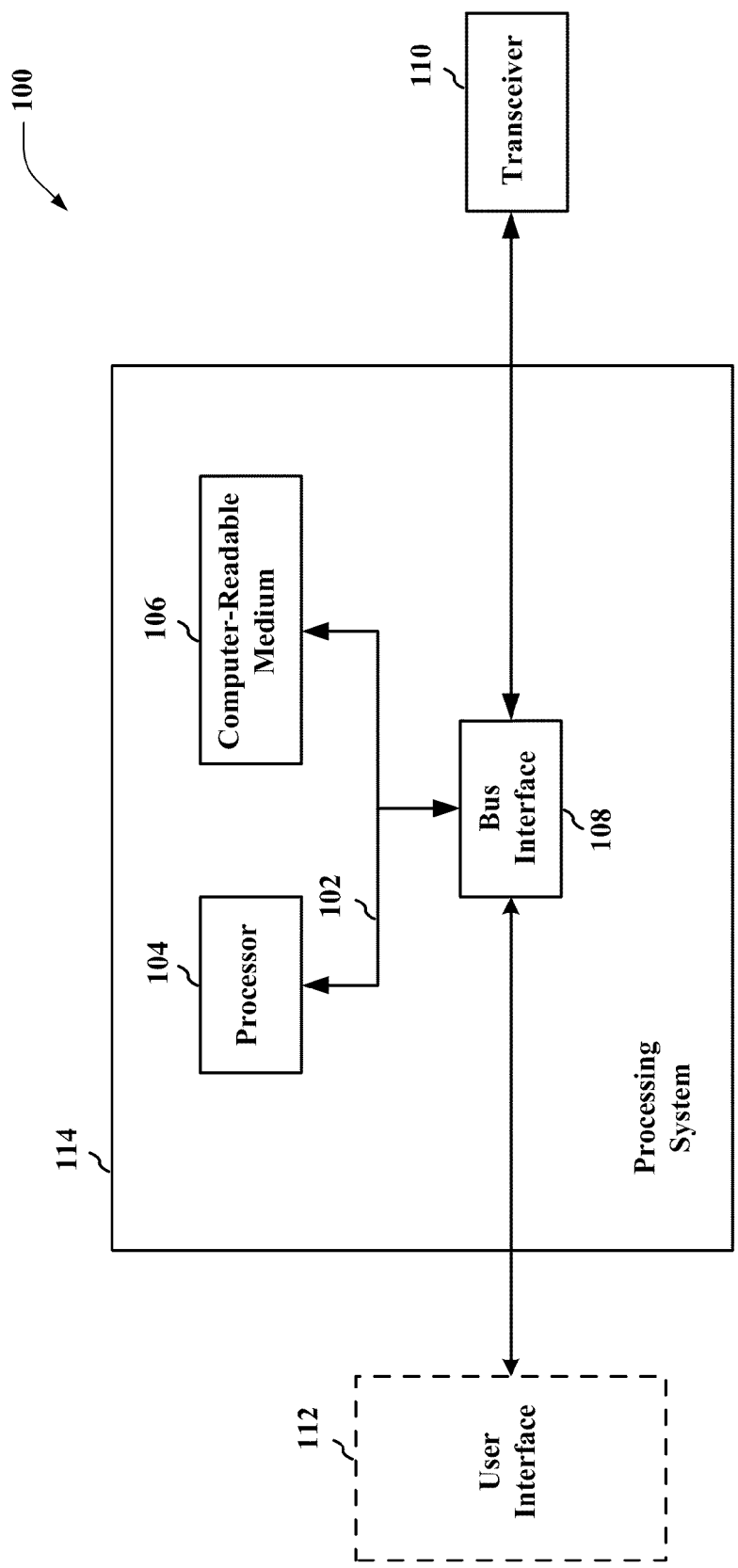
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by bus 102. The bus 102 may include any number of interconnecting buses and bridges depending on the specific application of the processing system 114 and the overall design constraints. The bus 102 links together various circuits including one or more processors, represented generally by processor 104, and computer-readable media, represented generally by computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
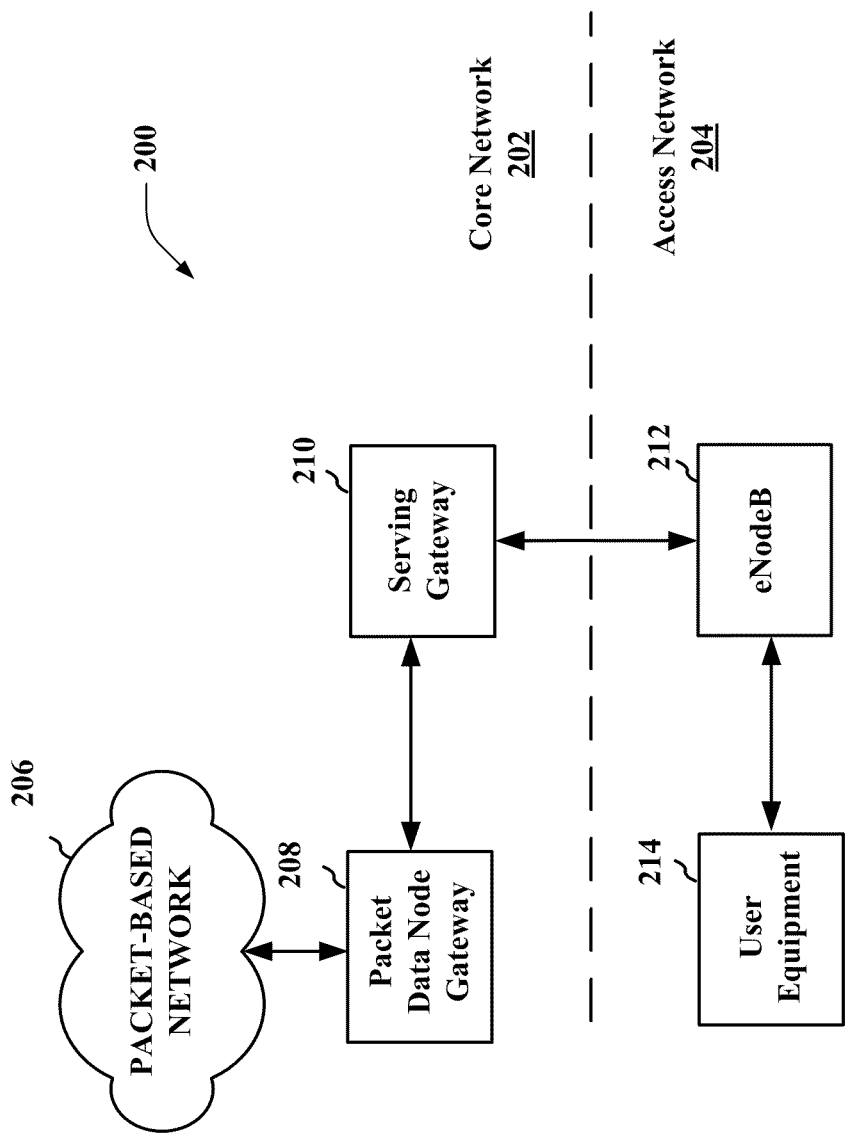
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single base station, labeled as an evolved NodeB (eNodeB 212), as it is referred to in LTE applications, but the same device may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus (e.g., a user equipment 214). Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
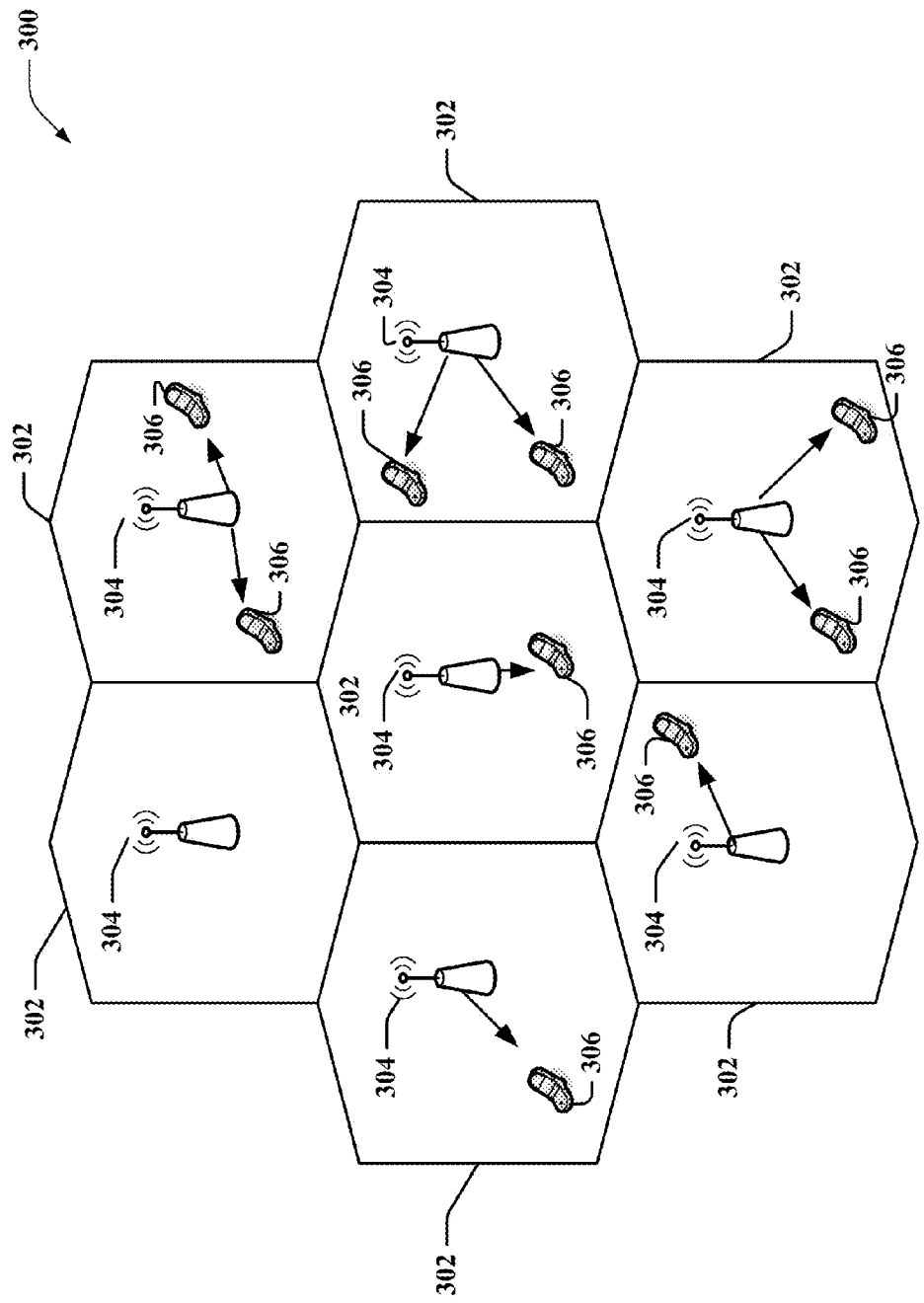
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
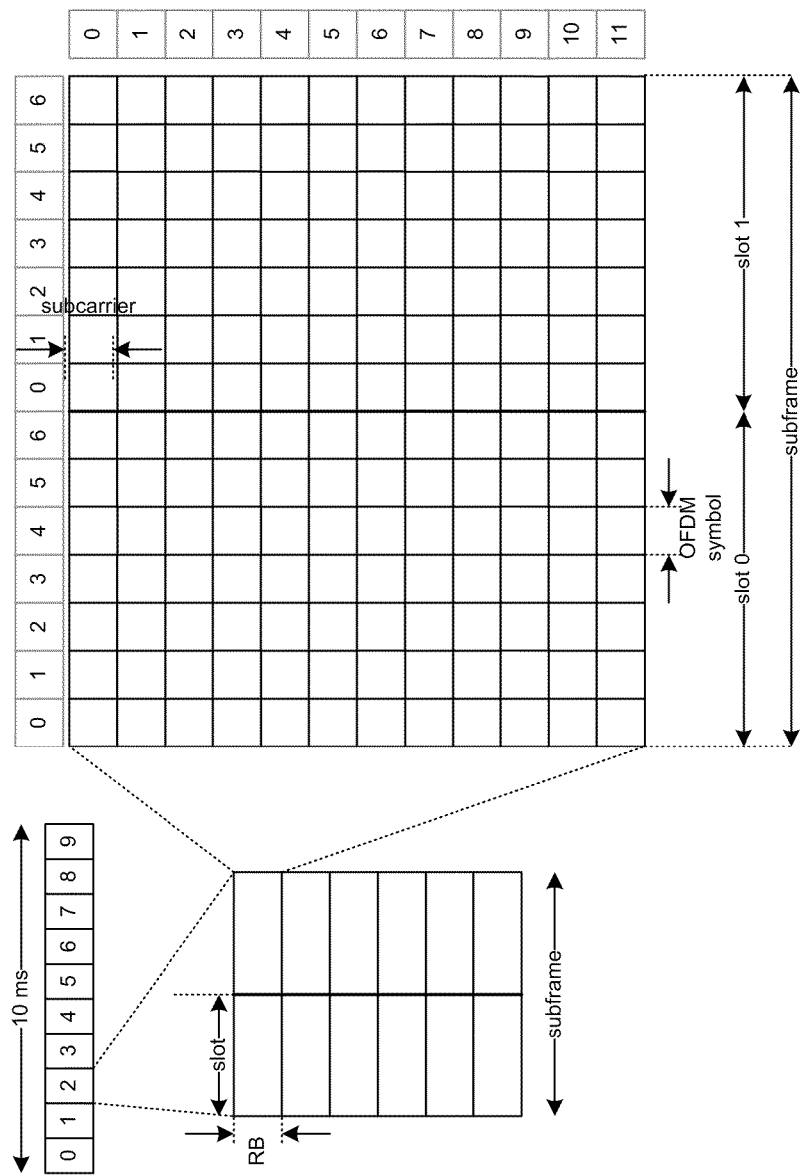
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

Figure 5:
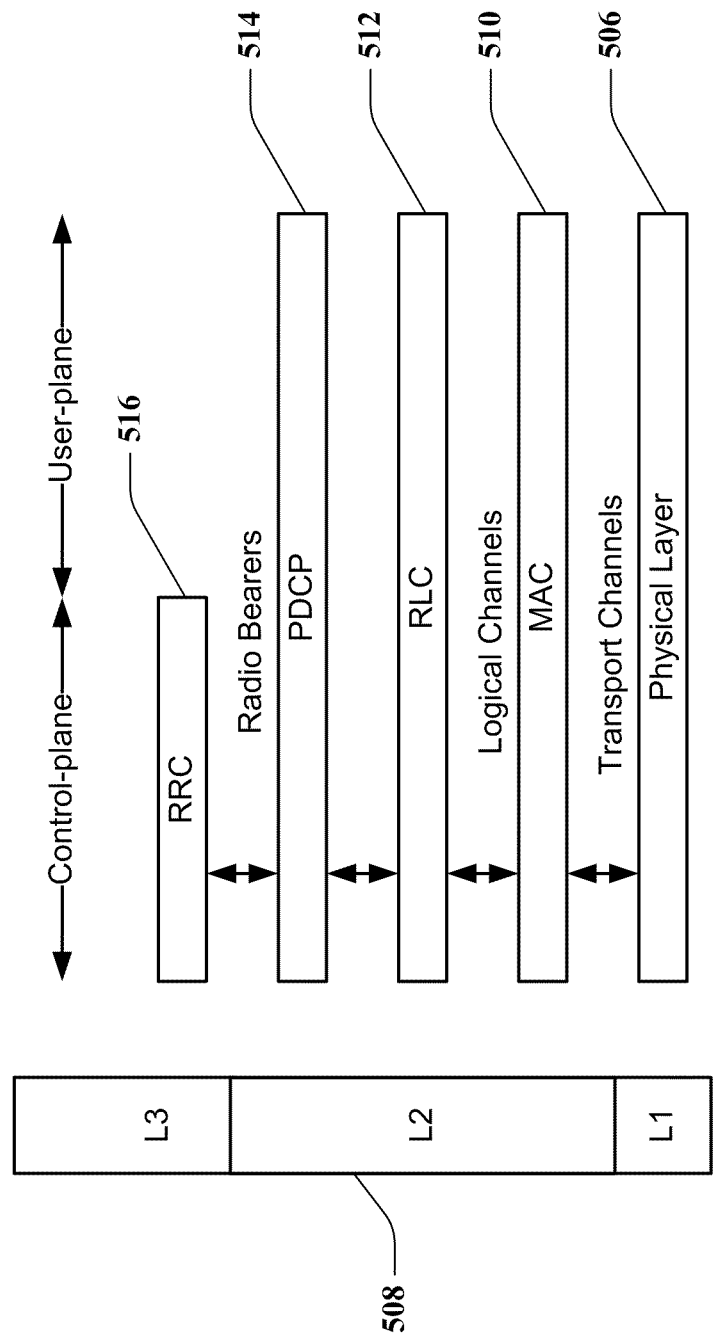
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest layer and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
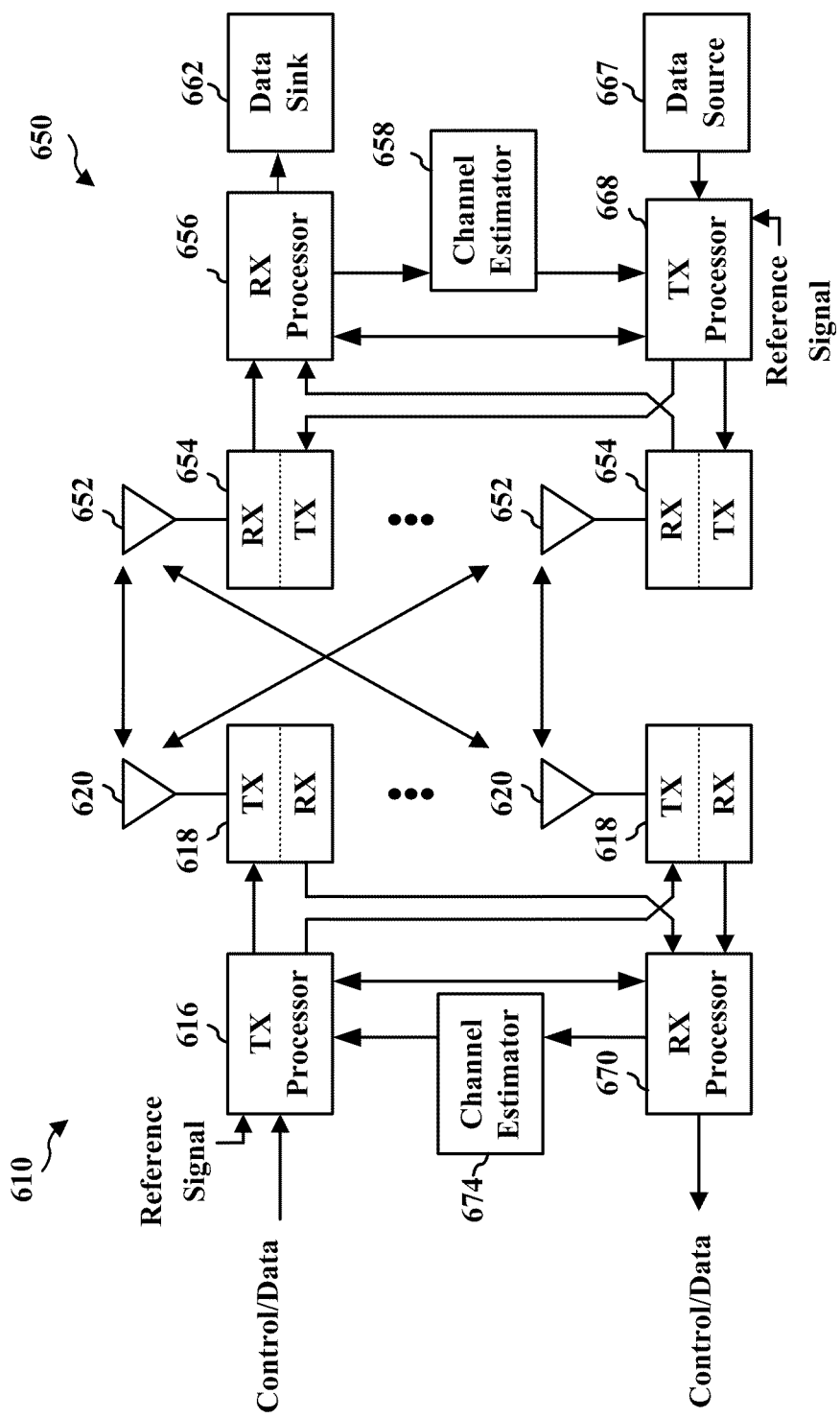
FIG. 6 is a conceptual diagram illustrating an example of an eNodeB and UE in an access network, in accordance with certain aspects of the disclosure.

FIG. 6 is a block diagram of a eNodeB 610 in communication with a UE 650 in an access network. In the DL, upper layer packets from the core network are provided to a transmit (TX) processor 616. The TX processor 616 implements the functionality of the L1, L2, and L3 layers. With respect to L2 layer functionality, the TX processor 616 compresses the headers of the upper layer packets, ciphers the packets, segments the ciphered packets, reorders the segmented packets, multiplexes the data packets between logical and transport channels, and allocates radio resources to the UE 650 based on various priority metrics. The TX processor 616 is also responsible for HARQ operations, retransmission of lost packets, and signaling to the UE 650 based on controls from the L3 layer.

With respect to L1 layer functionality, the TX processor 616 implements various signal processing functions for the physical layer. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter TX 618. Each transmitter TX 618 modulates an RF carrier with a respective spatial stream for transmission.

At the UE 650, each receiver RX 654 receives a signal through its respective antenna 652. Each receiver RX 654 recovers information modulated onto an RF carrier and provides the information to the receiver RX processor 656.

The RX processor 656 implements various signal processing functions of the L1, L2, and L3 layers. With respect to the L1 layer functionality, the RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the L2 layer.

With respect to the L2 layer functionality, the RX processor 656 provides demultiplexing between transport and logical channels, reassembles the data packets into upper layer packets, deciphers the upper layer packets, decompresses the headers and processes the control signals. The upper layer packets are then provided to a data sink 662, which represents all the protocol layers above the L2 layer. The RX processor 656 is also responsible for error detection using an acknowledgement (ACK) and/or negative acknowledgement (NACK) protocol to support HARQ operations. The control signals are provided to the L3 layer.

In the UL, a data source 667 is used to provide data packets to a transmit (TX) processor 668. The data source 667 represents all protocol layers above the L2 layer (L2). Similar to the functionality described in connection with the DL transmission by the eNodeB 610, the TX processor 668 implements the L1, L2, and L3 layers for the user plane and the control plane. Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654 TX. Each transmitter 654 TX modulates an RF carrier with a respective spatial stream for transmission.

The UL transmission is processed at the eNodeB 610 in a manner similar to that described in connection with the receiver function at the UE 650. Each receiver RX 618 receives a signal through its respective antenna 620. Each receiver RX 618 recovers information modulated onto an RF carrier and provides the information to a RX processor 670. The RX processor 670 implements the L1, L2, and L3 layers. Upper layer packets from the RX processor may be provided to the core network and control signals may be provided to the L3 layer.

Figure 7:
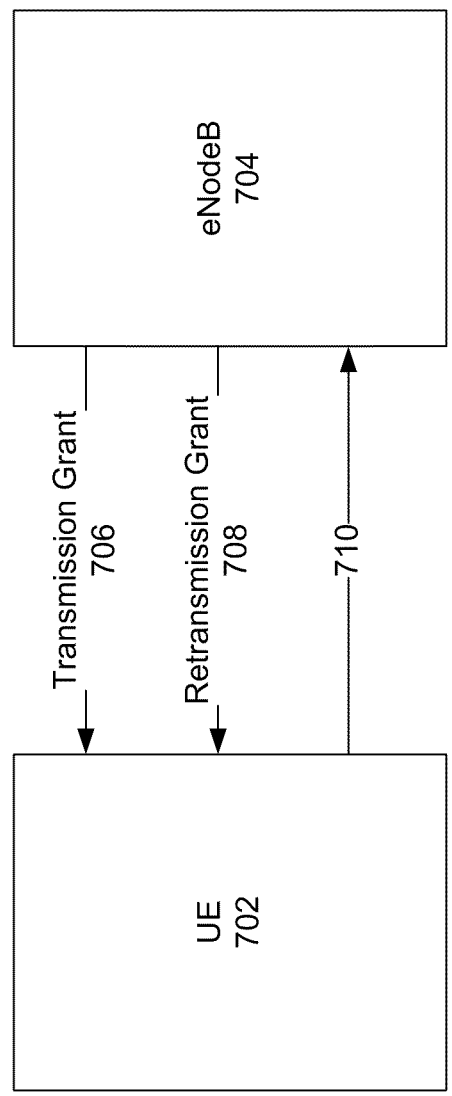
FIG. 7 is a conceptual diagram illustrating a UE in communication with an eNodeB, in accordance with certain aspects of the disclosure.

FIG. 7 is a conceptual diagram illustrating an example system, in which techniques described herein may be practiced. As illustrated, the system 700 may include UE 702 in communication with an eNodeB 704. The UE 702 and eNodeB 704 may be similar, for example, to the UE 650 and eNodeB 610 described with reference to FIG. 6.

As illustrated, the UE 702 may receive a transmission grant 706 from the eNodeB 704. The transmission grant may convey one or more parameters that may be used to determine parameters for a corresponding transmission, such as a transport block size and a number of resource blocks for the transmission.

The grant may be a downlink transmission (from the eNodeB 704 to the UE 702) or an uplink transmission (from the UE 702 to the eNodeB 704). In either case, a retransmission may be necessary, if the transmission was not properly received.

Thus, the UE 702 may receive a retransmission grant 708 from the eNodeB 704. As with the original grant, the retransmission grant may also assign a transport block size and a number of resource blocks for the retransmission.

According to certain rules, the transport block size (TBS) for a physical uplink shared channel (PUSCH) or physical downlink shared channel (PDSCH) retransmission may come from the original grant for the same transport block (first transmission) while the number of resource blocks (RBs) assigned for the retransmission may come from the current physical downlink control channel (PDCCH) grant. For example, in LTE Release 8, the TBS for the PUSCH retransmission may be as specified in the original grant for the same transport block (sent in the original transmission) while the number of RBs for the PUSCH retransmission may be as specified in the subsequent retransmission grant. Both the transmission grant (i.e., first grant) and the retransmission grant may be received in the PDCCH.

In the case where the TBS for a retransmission is determined from the original grant for the same transport block (first transmission) while the number of RBs assigned for retransmission comes from the subsequent PDCCH, the UE 702 might act unconstructively in response to the retransmission grant if the retransmission grant is an invalid grant. As used herein, the term invalid grant generally refers to a grant that is misconfigured by the eNodeB 704 or to a grant that is received by the UE 702 with valid values, but not values sent by the eNodeB 704. It may not be possible to exclude all invalid grants, because there may be a false grant with valid bit fields. However, a probability of acting unconstructively upon an invalid grant may be reduced by the techniques provided herein.

For example, the techniques presented herein may allow a UE 702 to determine that a retransmission grant is an invalid grant and act accordingly. For example, as will be described in greater detail below, the UE 702 may ignore a corresponding transmission (e.g., refraining from sending a retransmission of a previous transmission and/or from decoding a downlink transmission) or limit adjustments to transmit power of a response 710 sent to the eNodeB 704.

If either the transport block size or the number of resource blocks from the first transmission grant is used for the retransmission grant, the UE 702 receive an invalid retransmission grant, for example, that may result in the UE 702 determining a code rate of more than one for the PUSCH retransmission and/or determining too much power control compensation for PUSCH power control on the retransmission.

The invalid retransmission may also be a false alarm grant for DL PDSCH or a misconfiguration for a retransmission grant for DL PDSCH where the assignments for the transport block size and the number of resource blocks come from different grants.

According to certain aspects, when the retransmission assignment for the transport block size and the number of resource blocks come from different grants, the UE 702 may be configured to obey the following rules. For PUSCH UL transmission, if the code rate is more than a predetermined value (e.g., a threshold code rate), the PUSCH retransmission is dropped by not transmitting on the PUSCH in response to the retransmission grant. In one configuration, the predetermined value may be less than one. In another configuration, the predetermined value may be at least one.

For DL PDSCH decoding, if the code rate is more than a predetermined threshold value, the retransmission may be dropped by not transmitting a hybrid automatic repeat request (HARQ) ACK/NACK in response to the retransmission grant. In one configuration, the threshold value corresponds to a value less than one. In another configuration, the threshold value may correspond to a code rate of at least one.

Figure 8:
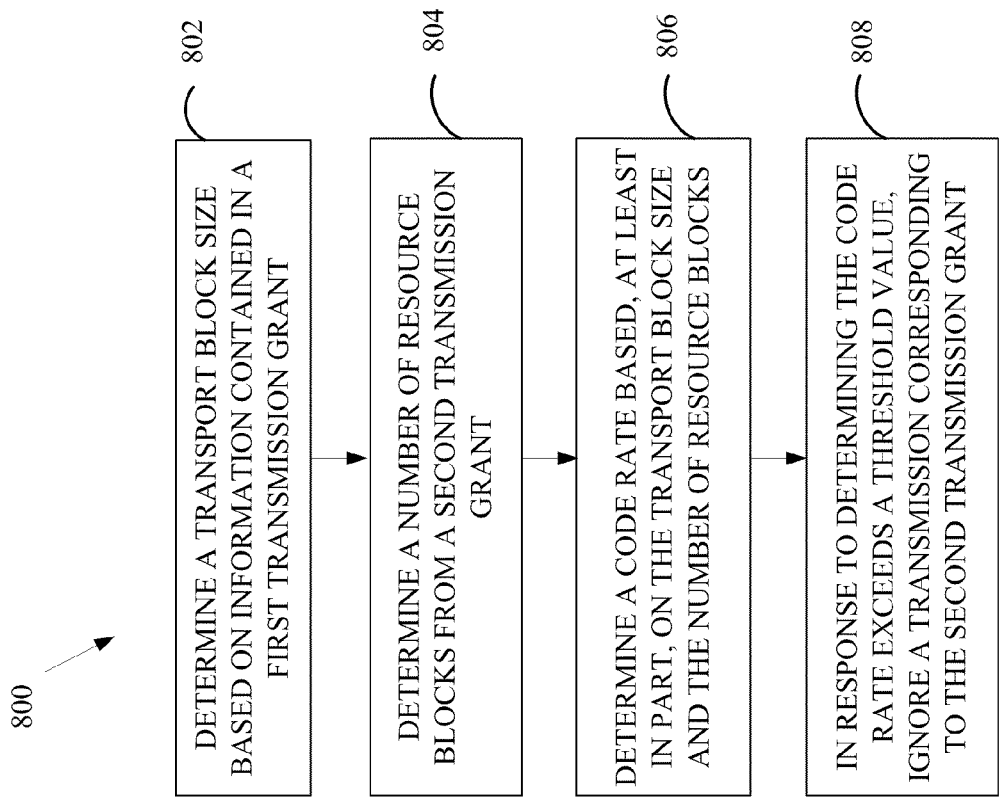
FIG. 8 is a flow chart of a method of wireless communication, in accordance with certain aspects of the disclosure.

FIG. 8 is a flow chart of example operations 800 for method of wireless communication in accordance with certain aspects of the disclosure. The operations 800 may be performed, for example, by a UE.

The operations 800 begin, at 802, by determining a transport block size based on information contained in a first transmission grant. At 804, the UE determines a number of resource blocks from a second transmission grant. At 806, the UE determines a code rate based, at least in part, on the transport block size and the number of resource blocks. At 808, in response to determining the code rate exceeds a threshold value, the UE ignores a transmission corresponding to the second transmission grant.

According to certain aspects, the UE may ignore a transmission, for example, by not sending an uplink transmission or by not sending a HARQ ACK for a downlink transmission or by simply not decoding a downlink transmission.

Invalid grants may also present problems with regard to systems that employ delta modulation and coding scheme (MCS) compensation, where UL PUSCH power is boosted to compensate for changes in MCS. The additional power boost to compensate for delta MCS may be calculated based on the ratio of a total number of coded bits from the retransmission grant divided by the number of resource elements from the first transmission.

However, the total number of coded bits from the retransmission grant may be determined based on the transport block size from the original grant, while the number of resource blocks may be specified in the retransmission grant. In some scenarios, this may result in excessive boosts in power, which may be detrimental to a UE.

According to certain aspects, transmission power for a retransmission may be control by applying an upper limit and/or a lower limit in response to detecting a possibly invalid grant. For example, for PUSCH power control, if the delta MCS power compensation X for PUSCH power control, where X may equal a sum of coded bits from the current PUSCH grant divided by a number of resource elements from the initial PDCCH grant, is not within a particular range (i.e., Lower_Limit<=X<=Upper_Limit), then the power compensation may be adjusted. In other words, when adjusting the power compensation, the power compensation may be adjusted to the Lower_Limit when the determined power compensation is less than the Lower_Limit and may be adjusted to the Upper_Limit when the determined power compensation is greater than the Upper_Limit.

FIG. 9 is a flow chart of example operations 900 for another method of wireless communication in accordance with certain aspects of the disclosure. The operations 900 may also be performed, for example, by a UE.

The operations 900 begin, at 902, by determining a number of resource elements from a first transmission grant. At 904, the UE determines a sum of coded bits from a second transmission grant. At 906, the UE limits a range of modulation and coding scheme (MCS) power control for a physical uplink channel power control calculated based on the number of resource elements (REs) determined from the first transmission grant and the sum of coded bits determined from the second transmission.

The various illustrative logical blocks, modules and circuits described in connection with the disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Bluray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the disclosure, other and further aspects of the disclosure may be devised without departing from the basic scope thereof, and the scope thereof is determined by the claims that follow.

What is claimed is:

1. A method of wireless communication, comprising:
   determining a transport block size based on information contained in a first transmission grant;
   determining a number of resource blocks from a second transmission grant;
   determining a code rate based, at least in part, on the transport block size and the number of resource blocks; and
   in response to determining the code rate exceeds a threshold value, ignoring a transmission corresponding to the second transmission grant.

2. The method of claim 1, wherein the first and second transmission grants are for uplink transmissions.

3. The method of claim 2, wherein:
   the second transmission grant is for a retransmission of a previous uplink transmission; and
   ignoring the transmission corresponding to the second transmission grant comprises refraining from sending the retransmission.

4. The method of claim 1, wherein:
   the second transmission grant is for a downlink transmission; and
   ignoring the transmission corresponding to the second transmission grant comprises refraining from decoding the downlink transmission.

5. The method of claim 1, wherein the threshold value comprises a code rate of at least 1.

6. The method of claim 1, further comprising detecting that the second transmission grant comprises at least one of a false alarm grant or a misconfigured grant based on the determined code rate.

7. An apparatus for wireless communication, comprising:
means for determining a transport block size based on information contained in a first transmission grant;
means for determining a number of resource blocks from a second transmission grant;
means for determining a code rate based, at least in part, on the transport block size and the number of resource blocks; and
means for, in response to determining the code rate exceeds a threshold value, ignoring a transmission corresponding to the second transmission grant.

8. The apparatus of claim 7, wherein the first and second transmission grants are for uplink transmissions.

9. The apparatus of claim 8, wherein:
the second transmission grant is for a retransmission of a previous uplink transmission; and
ignoring the transmission corresponding to the second transmission grant comprises refraining from sending the retransmission.

10. The apparatus of claim 7, wherein:
the second transmission grant is for a downlink transmission; and
ignoring the transmission corresponding to the second transmission grant comprises refraining from decoding the downlink transmission.

11. The apparatus of claim 7, wherein the threshold value comprises a code rate of at least 1.

12. The apparatus of claim 7, further comprising means for detecting that the second transmission grant comprises at least one of a false alarm grant or a misconfigured grant based on the determined code rate.

13. An apparatus for wireless communication, comprising:
at least one processor configured to:
determine a transport block size based on information contained in a first transmission grant, determine a number of resource blocks from a second transmission grant, determine a code rate based, at least in part, on the transport block size and the number of resource blocks, and, in response to determining the code rate exceeds a threshold value, ignore a transmission corresponding to the second transmission grant; and
a memory coupled with the at least one processor.

14. A computer-program product comprising a non-transitory computer-readable storage medium having instructions stored thereon, the instructions executable by a processor for:
determining a transport block size based on information contained in a first transmission grant;
determining a number of resource blocks from a second transmission grant;
determining a code rate based, at least in part, on the transport block size and the number of resource blocks; and
in response to determining the code rate exceeds a threshold value, ignoring a transmission corresponding to the second transmission grant.

* * * * *